United States Patent [19]

Stimson et al.

[11] Patent Number: 5,721,768
[45] Date of Patent: Feb. 24, 1998

[54] PRE-PAID CARD SYSTEM AND METHOD

[75] Inventors: Charles J. Stimson; Brady S. Beshear, both of Garland, Tex.

[73] Assignee: Call Processing, Inc., Dallas, Tex.

[21] Appl. No.: 751,499

[22] Filed: Nov. 18, 1996

Related U.S. Application Data

[63] Continuation of Ser. No. 407,094, Mar. 20, 1995, Pat. No. 5,577,109, which is a continuation-in-part of Ser. No. 254,237, Jun. 6, 1994, Pat. No. 5,511,114.

[51] Int. Cl.$^6$ .............. G06H 5/00; G07D 7/00; H04M 15/00; H04M 17/00

[52] U.S. Cl. .............. 379/114; 379/121; 379/144; 235/380; 340/825.34

[58] Field of Search .............. 379/112, 114, 379/115, 121, 124, 125, 126, 127, 130, 131, 144; 235/380, 381, 279; 340/825.23, 825.34, 825.35

[56] References Cited

U.S. PATENT DOCUMENTS

| 3,652,795 | 3/1972 | Wolf et al. |
| 4,439,636 | 3/1984 | Newkirk et al. |
| 4,587,379 | 5/1986 | Masuda |
| 4,706,275 | 11/1987 | Kamil |

(List continued on next page.)

FOREIGN PATENT DOCUMENTS

| 2575016 | 6/1986 | France |
| 62-54623 | 9/1987 | Japan |
| 62-266960 | 11/1987 | Japan |
| 2-61786 | 3/1990 | Japan |
| 2-79193 | 3/1990 | Japan |
| 2-245893 | 10/1990 | Japan |
| 3-24684 | 2/1991 | Japan |
| 3-62296 | 3/1991 | Japan |
| 4-1891 | 1/1992 | Japan |
| 4-43493 | 2/1992 | Japan |
| 4-140896 | 5/1992 | Japan |
| 4-354092 | 12/1992 | Japan |
| 6-121075 | 4/1994 | Japan |
| 2151061 | 7/1985 | United Kingdom |
| 2215897 | 9/1989 | United Kingdom |
| 406841 | 1/1991 | WIPO |

OTHER PUBLICATIONS

Stimson, "Prepaid Calling Cards—Friend or Foe?", *Public Communications Magazine*, pp. 18–20 (Aug. 1994).

Perkins et al., Ed, *Card Calling and Pay Telephones*, Consumer Reports 1992 Travel Buying Guide, 1992, pp. 293–299.

Article, *Payment Systems: Europe Steals a Lead in Chip Card Systems, but They Pose New Problems*, Tech Europe, Sep. 9, 1993, Section 85.

Article, *AFS Pulls Out of Shrinking Travellers Cheque Market*, MEED Middle East Business Weekly, Mar. 11, 1994, vol. 38, No. 10, p. 4.

Article, *2 Networks, 2 Philosophies*, The American Banker, Sep. 9, 1994, p. 8.

*Primary Examiner*—Curtis Kuntz
*Assistant Examiner*—Paul Loomis
*Attorney, Agent, or Firm*—Merchant, Gould, Smith, Edell, Welter & Schmidt, P.A.

[57] ABSTRACT

A pre-paid card system enables customers to make purchases using an authorized card. The system includes four main functional components: a plurality of cards, a host computer, a plurality of on-site activation terminals and a main processor. Each of the cards having a security number associated therewith. The card is typically formed of cardboard, paper or plastic and may include the security number in cleartext under a suitable blackout. The main management and processing of the system is effected by the host computer. The host includes a database for storing security numbers associated with authorized cards. The data terminals are remote from the host computer and connectible thereto for transmitting data between the terminals and the host computer. The processor is controlled by the host computer for enabling customer purchases using the authorized cards.

12 Claims, 2 Drawing Sheets

U.S. PATENT DOCUMENTS

| | | |
|---|---|---|
| 4,776,000 | 10/1988 | Parienti . |
| 4,877,947 | 10/1989 | Toru . |
| 4,879,794 | 11/1989 | Tasaski . |
| 4,951,308 | 8/1990 | Bishop et al. . |
| 5,086,457 | 2/1992 | Barraud et al. . |
| 5,101,098 | 3/1992 | Yoshinobu . |
| 5,146,067 | 9/1992 | Sloan et al. . |
| 5,155,342 | 10/1992 | Takayoshi . |
| 5,163,086 | 11/1992 | Ahearn et al. . |
| 5,192,947 | 3/1993 | Neustein . |
| 5,225,666 | 7/1993 | Carmelo et al. . |
| 5,226,073 | 7/1993 | Albal et al. . |
| 5,264,689 | 11/1993 | Erik et al. . |
| 5,266,785 | 11/1993 | Alanärä et al. . |
| 5,327,482 | 7/1994 | Yamamoto . |
| 5,352,876 | 10/1994 | Wantababe et al. . |
| 5,359,182 | 10/1994 | Schilling . |
| 5,359,642 | 10/1994 | Castro . |
| 5,408,519 | 4/1995 | Pierce et al. . |
| 5,409,092 | 4/1995 | Itaka et al. . |
| 5,450,477 | 9/1995 | Amarant et al. . |
| 5,477,038 | 12/1995 | Levine et al. . |
| 5,504,808 | 4/1996 | Hamrick, Jr. ............................ 379/144 |
| 5,621,787 | 4/1997 | McKowy et al. ........................ 379/114 |

5,721,768

PRE-PAID CARD SYSTEM AND METHOD

RELATED APPLICATIONS

This is a continuation of application Ser. No. 08/407,094 filed on Mar. 20, 1995, now U.S. Pat. No. 5,577,109 which application was a continuation-in-part of prior Ser. No. 08/254,237, filed Jun. 6, 1994, now U.S. Pat. No. 5,511,114.

TECHNICAL FIELD

The present invention relates generally to pre-paid services and more particularly to a pre-paid card systems having a remote terminal to provide on-site activation and recharging of cards in customer-defined amounts.

BACKGROUND OF THE INVENTION

Pre-paid calling card services are well-known in the art. Such cards are typically purchased from vending machines and the like and come in fixed value increments, for example, $10, $20 and $50. A $10 card provides the customer with a certain number (e.g., 30) minutes of long distance time from any touch-tone telephone to any location in the United States, regardless of the time of the call; the $20 card provides twice that amount, and so forth. Because the long distance charges are limited to the card's face value, neither the customer nor anyone who obtains possession of the card can run up a large bill.

In operation of the prior art system, cards are batch-activated by the card provider in a limited number of predetermined values. A customer purchases one of these pre-activated cards by paying a fee. The card typically includes a predetermined identification code (which may be obscured by a scratch off material). To use the card, the customer accesses the service (usually through an 800-number), enters the identification code (typically obtained from the back of the card), dials the destination number and the call begins. Prior to dialing, the system may inform the user of a then-current card balance. If during a call the time remaining on the card is about to expire, the customer may be prompted (through a voice over) that only a certain amount of time (e.g., 30 seconds) remains. When the designated time has expired, the call is automatically terminated.

Such systems have proved commercially successful and desirable for several reasons. Pre-paid calling card customers avoid collect and operator assistance surcharges, and they can obtain long distance calling without credit and without payment of monthly bills. The cards themselves are easy to use. While the prior art systems have proven advantageous, they have somewhat limited flexibility. The most significant drawback is the requirement that pre-paid calling cards be issued in fixed or preset amounts. Also, once the time allotted to a particular calling card expires, the card is typically discarded, requiring the customer to carry multiple cards that can be stolen or lost. Existing systems do not have the flexibility to allow the customers to purchase variable amounts of calling time or to recharge "used" cards at the retail site.

There is thus a need for improved telephone pre-paid calling card systems that overcome these and other problems associated with the prior art.

BRIEF SUMMARY OF THE INVENTION

It is an object of the present invention to provide a pre-paid card system that includes on-site activation of cards in varying amounts.

It is still another object of the invention to provide a pre-paid card system and method that facilitates point-of-sale activation of cards using data terminals connectible to a host computer.

It is yet another object of the present invention to provide a card system wherein on-site recharging is provided to enable a pre-paid card to be reactivated and re-used following expiration of all, part or none of an initial authorization amount.

It is a further object of the invention to provide a pre-paid card system having a plurality of data terminals remotely connectible to a host computer, each of the data terminals providing on-site point-of-sale activation and recharging of cards in varying amounts. The host computer dynamically manages each of the authorized cards.

It is still another object of the invention to provide a pre-paid card system wherein each authorized card has a security number associated therewith for enabling a host computer to track usage, rechargings, recharge locations and similar management information. Preferably cards are authorized or re-authorized for variable amounts although "stale" cards, i.e., cards that have been sold but not used or reauthorized for a predetermined time period (e.g., 6 months) may be purged from the system.

It is still a further object of the invention to provide a pre-paid card system wherein the host computer maintains a database of authorized cards, the database including detailed information about the authorization, recharge and use status of each card in the system.

In a preferred embodiment, a pre-paid calling card system enables customers to access a telephone network and obtain long distance telephone service. The system includes four main functional components: a plurality of calling cards, a host computer, a plurality of activation terminals and a call processor. Each of the calling cards preferably includes a body portion and a read-only memory stripe having stored therein a security number. The card is typically formed of cardboard or plastic and may include the security number in cleartext under a suitable blackout. The main management and processing of the system is effected by the host computer, which is connectible to the telephone network. The host includes a database for storing security numbers associated with authorized calling cards. The data terminals are remote from the host computer and connectible thereto for transmitting data between the terminals and the host computer. The call processor is controlled by the host computer for interfacing one or more customers to the telephone network using the authorized calling cards.

Preferably, each data terminal includes means (such as a cardreader) for reading a calling card to determine the security number stored in the read-only memory thereof, means (such as a keypad) for entering any monetary amount corresponding to an amount of call authorization associated with a particular calling card, means (such as a modem) for dialing the host computer to transfer the security number, the call authorization amount and the data terminal identification, and means (such as a display) for receiving and displaying a verification message from the host computer authorizing receipt of the monetary amount.

The data terminal allows for variable authorization and recharging of a calling card. When the cardreader cannot detect the security number stored in the memory (which may occur, for example, when the card has been damaged and it is presented for recharging), the data terminal operator may enter the security number using the keypad to enable point-of-sale activation or recharging of the card. By keeping track of the security number and the identification of the authorizing data terminal, the system can generate accounting and/or billing information so that system operator can determine which data terminal operator authorized and/or recharged a particular calling card. This enables the system operator to reconcile all transactions.

In an alternative embodiment of the present invention, a user may activate or recharge a pre-paid card with an authorized dollar amount at a user activation terminal. The pre-paid card may then be used to purchase various goods and services up to the authorized dollar amount. The pre-paid card and activation terminals function in the same manner as discussed above with respect to a calling card. The activation terminals are interfaced with a main processor. The main processor includes a host computer responsible for management and processing of the system through a purchasing network. The host computer includes a data base for storing security numbers associated with authorized purchase cards and enables users to purchase goods and services up to authorized dollar amounts using the authorized pre-paid cards.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

Similar reference characters refer to similar parts throughout the several views of the drawings.

DETAILED DESCRIPTION

Figure 1:
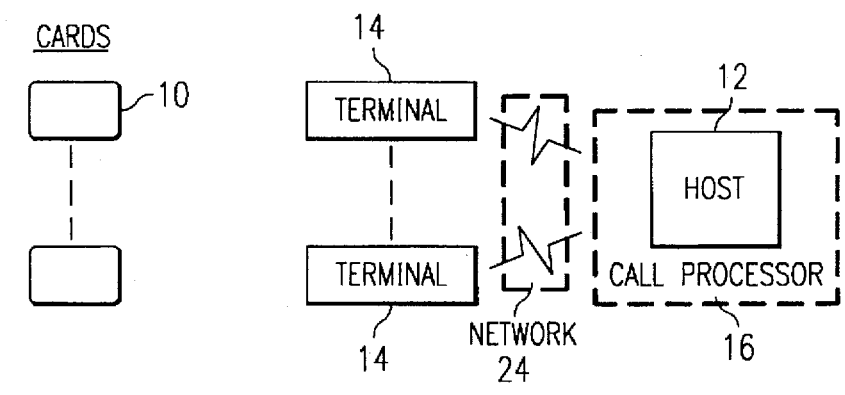
FIG. 1 is a block diagram of the telephone pre-paid calling card system of the present invention.
Figure 2:
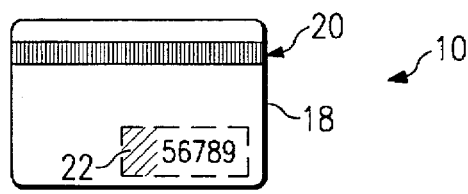
FIG. 2 is a representative pre-paid calling card.

Referring now to the drawings, there is illustrated an exemplary pre-paid calling card system that enables customers to access a telephone network and obtain long distance telephone service. As seen in FIG. 1, the system includes four main functional components: a plurality of calling cards 10, a host computer 12, a plurality of on-site activation terminals 14 and a call processor 16. As seen in FIG. 2, each of the calling cards preferably includes a body portion 18 and a read-only memory stripe 20 having stored therein a security number. The card is typically formed of cardboard, paper or plastic and may include the security number in cleartext under a suitable user-removable scratch-off or other material 22 (such as an opaque tape). If desired, a smart card may be used to store the security number or other information, although preferably the system and method are implemented with so-called "dumb" or non-intelligent cards.

The main management and processing of the system is effected by the host computer 12, which is connectible to the telephone network 24. Although not meant to be limiting, preferably the host computer is a general purpose x86-type personal computer running a multi-tasking operating system such as UNIX. Alternatively, the host computer is implemented with any WINDOWS-based operating system. The host computer has sufficient storage associated therewith to enable a call record to be maintained for every authorized calling card in the system. The call record format will be described below.

Figure 3:
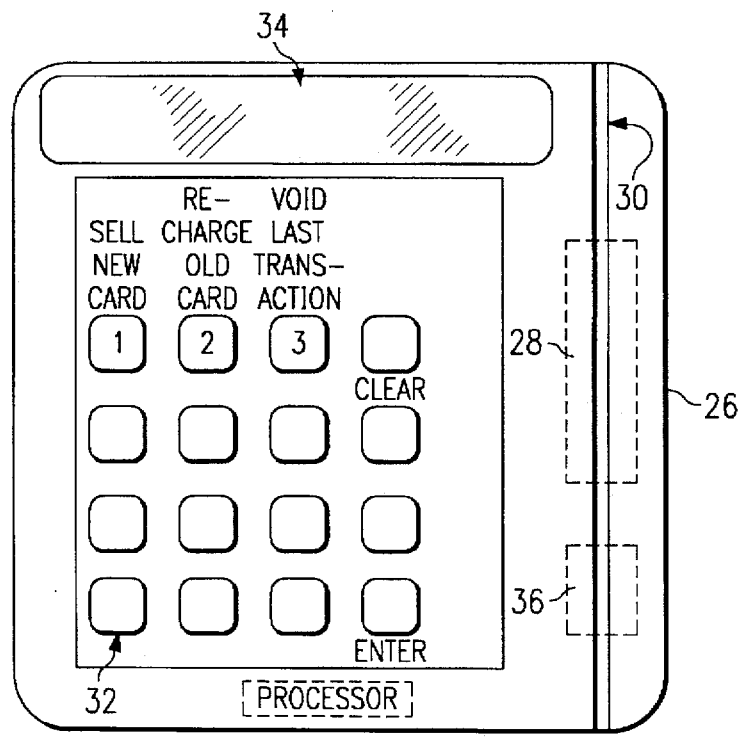
FIG. 3 is a plan view of one of the data terminals of FIG. 1 showing the keypad, display and card swipe components of the unit.

Each of the plurality of on-site activation terminals 14 is preferably a Model XL300 from Verifone, although other models may be used. As seen in FIG. 3, the activation terminal includes a housing 26 in which a number of functional components are included. A cardreader 28 includes a card-swipe slot 30 for receiving the calling card so that the memory stripe can be read. The unit also preferably includes a keypad 32 with various alphanumeric and control keys, and a display 34. The unit also includes a modem 36 (shown in phantom) for connecting the device over a telephone line to the host computer. The activation terminal also includes appropriate control circuitry for controlling the operation of the device.

Each of the terminals 14 is preferably located at a point-of-sale location where the calling cards are sold to users. The calling cards themselves may be stored under the terminal 14 in any convenient fashion. Generally, the data terminals are remote from the host computer and connectible thereto for transmitting data between the terminals and the host computer.

As can be seen, each data terminal 14 includes means (such as a cardreader) for reading a calling card to determine the security number stored in the read-only memory thereof, means (such as a keypad) for entering any monetary amount corresponding to an amount of call authorization associated with a particular calling card, means (such as a modem) for connecting to the host computer to transfer the security number, the call authorization amount and the data terminal identification, and means (such as a display) for receiving and displaying a verification message from the host computer authorizing receipt of the monetary amount. These particular input/output devices of the data terminal are merely exemplary, as other equivalent devices may also be used. For example, the cardreader may be replaced or supplemented with an optical scanner (to read a bar code or the like). When the cardreader cannot detect the security number stored in the memory (which may occur, for example, when the card is presented for recharging), the data terminal operator may enter the security number using the keypad to enable point-of-sale activation or recharging of the card. Likewise, the keypad may be replaced or supplemented with a voice recognition card connected to a microphone for providing limited speaker-independent or speaker-dependent discrete or continuous voice recognition. The communications link need not be made over a telephone line, but may be wireless, fiber optic or include any other well-known means for establishing a communications link between two locations. The display itself may be aural as opposed to visual.

The data terminals allow for point-of-sale variable authorization and recharging of calling cards. By keeping track of the security number and the identification of the authorizing data terminal, the system can generate accounting and/or billing information so that system operator can determine which data terminal operator authorized and/or recharged a particular calling card. This enables the system operator to reconcile all transactions.

The call processor of FIG. 1 is controlled by the host computer for interfacing one or more customers to the telephone network using the authorized calling cards. In the preferred embodiment, the call processor includes dedicated hardware and software for interfacing each of the data terminals to the host computer and to the telephone network. The call processor includes a T1 interface card (made by Mitel) which provides an external interface for two digital T1 circuits. In the system, one T1 circuit interfaces to the data terminals, and the other T1 circuit interfaces to the telephone network. Each T1 card has a bandwidth of 24 multiplexed 64 K-bit/second channels. The call processor also includes a number of call processing boards to playback voice files, record voice for other applications such as voice mail, recognize DTMF signalling, outdial DTMF on the outbound portions of each call, and monitor call progress. Preferably each board is a Natural Microsystems Model VBX1200 (and/or AG24), which includes a digital signal processor, and each such board handles up to 12 or 24 ports, respectively. In operation, each call in the system is assigned a port.

Preferably, each call record established in the system includes a number of pieces of information: the calling card security number, the identity of the store at which the card was issued (i.e., the identification of the authorizing terminal), the card's issue date and time, the card's last use date and time, the card's last recharge store number (i.e., the identify of the data terminal at which the card was last recharged), the card balance ($xxx.xx), the card's last recharge amount, a "card-in-use" flag and the card's last recharge date and time. By keeping track of the data terminals at which a card is initially authorized and later recharged, the system operator can reconcile multiple data from different store locations. This enables the system operator to credit or charge store operators for recharging provided by other store operators in the system.

The operation of the system can now be described. In a preferred call scenario, the possessor of an activated calling card first accesses the service through a dedicated telephone number (such as an 800 number) to which the host computer/call processor are connected. Upon call connection, the user is prompted to enter "security code" from back of card. The host computer checks the database and gives the appropriate response such as "your balance is—minutes." Alternatively, the computer may issue a message that "this card was purchased or last recharged more than 6 months ago, please buy more TeleBuck$℠" and call again" or "this security code is invalid" as the case may be. If there is a balance, the computer prompts the user to enter the area code and number that the user desires to call. The call is connected and if an answer is detected, the computer keeps track of the minutes used as the call proceeds. If the balance reaches 2 minutes, the caller is warned with a "2 minutes left" message and likewise at 30 seconds. When the balance is exhausted, the computer cuts off in the conversation and plays a message such as "time is up, buy more TeleBuck$℠" at any retail location or call us at 1 800 xxx-xxxx for recharge options".

The following is a typical card activation or recharging scenario. Assume a customer comes up to the counter and requests $12 worth of calling time. The clerk then obtains the next calling card from the plurality of cards, and begins the activation process. This is achieved by pressing the "Sell New Card" key (1). The new card is then swiped through the card reader slot. The amount of the transaction is then entered on the keypad. At this point the terminal dials out via the modem and waits for an answer. After communicating with the host, transmitting the request, the card and terminal identifiers, and receiving a verification, the unit displays a suitable response message. The operator is then prompted to collect the funds and this message (e.g., by a message, "Done Collect $xxx.xx") tells the operator that the security number on this card has been activated for the amount shown. The transaction is completed by giving the card to the customer. If the customer desires to pay using a credit card which itself needs to be verified, the data terminal may also be used for this purpose. It should be further noted that the data terminals 14 may be implemented in existing payment terminals such as credit card, ATM or money order machines, and these existing payment terminals may be modified to accept other forms of payment.

Figure 4:
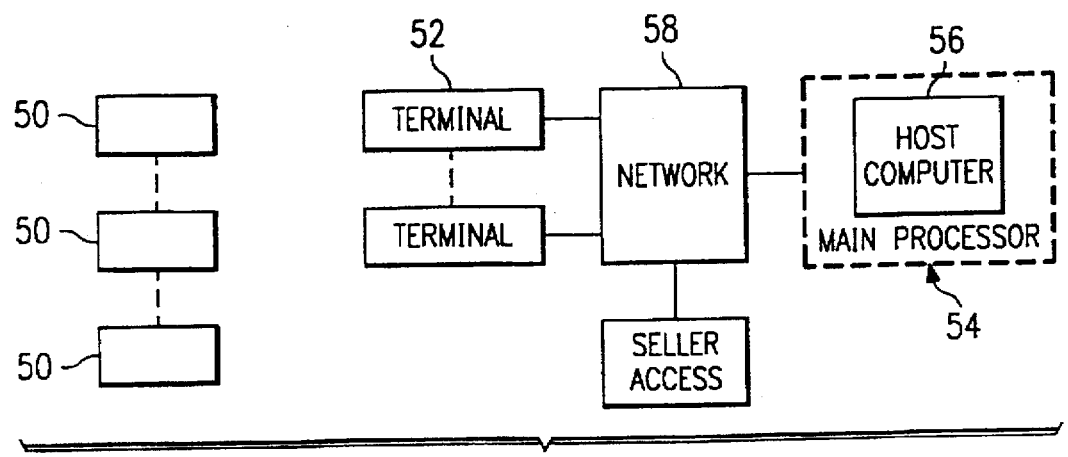
FIG. 4 is a block diagram of an alternative embodiment of the invention utilizing a pre-paid card system for purchasing a variety of goods and services up to an authorized dollar amount.

Referring now to FIG. 4, there is illustrated an alternative embodiment of the present invention wherein there is illustrated a block diagram of a pre-paid card system. Unless otherwise specified, this embodiment functions in much the same manner as the pre-paid calling card system discussed with respect to FIGS. 1 through 3. In this embodiment a variable amount of money is pre-authorized into a card 50. The pre-paid cards 50 include a body position 18 and read only memory stripe 20 having a security number stored thereon as shown in FIG. 2; alternatively, the security number may be the user's account number, a personal identification number (PIN) or some other information generally known only to the user whether encoded on the card 50 or not. The cards 50 may be credit cards, debit cards, smart cards, or any other type of purchasing card which is currently available or may in the future become generally available. The cards 50 are activated or recharged at a plurality of on-site activation terminals 52. The on-site activation terminals 52 have the same hardware and characteristics as the terminal discussed with respect to FIG. 3. The on-site activation terminals 52 interact with a main processor 54 operated by a host computer 56 via any of a variety of types of interconnecting networks 58, for example, a telephone network.

The hardware and software for implementing the main processor 54 and host computer 56 are similar to that discussed with respect to the call processor 16 and host computer 12 of FIG. 1. The host computer 56 contains sufficient storage associated therewith to enable purchase records to be maintained for each authorized card 50 in the system. Preferably, each purchase record established in the system includes a number of pieces of information: the card security number, the identity of the store at which the card was issued (i.e., the identification of the authorizing terminal), the card's issue date and time, the card's last use date and time, the card's last recharge number (i.e., the identity of the data terminal at which the card was last recharged), the purchase balance of the card ($xxx.xx), the card's last recharge amount, the card's last recharge date and time, and transaction codes associated with each purchase. By keeping track of the data terminals at which the card is initially authorized and later recharged, the system operator can reconcile multiple data from different locations. This enables the system operator to credit or charge store operators for recharging providing by other store operators in the system.

The operation of the system may now be described. In a preferred purchase scenario, the user of an activated card makes his purchase of a particular service or good and provides the card to a representative of the selling party. The seller or user is prompted to enter the "security code" from the back of the card 50. The security code may be entered by a magnetic card reader, manual entry or any other well known method. Entry of the security code enables access to the main processor 54 via a dedicated purchasing network, such as a telephone 800 number or other well-known type of communications method. Additionally, the user may manually enter a personal code (PIN number) known only to the user as an additional security measure. A purchase amount is also entered indicating the amount of a desired purchase. The host computer 56 of the main processor 54 checks the database for the data associated with the codes and notifies the seller and/or user if a sufficient balance is present to make the desired purchase. If a sufficient balance is not available, the host computer 56 may issue a receipt or message indicating the available balance and updated information concerning the purchase record. If a sufficient balance is present, the host computer 56 deducts the entered purchase amount from the card's balance and associates a transaction code with the purchase. The seller then completes the sale to the user. Upon completion of the sale, the user is provided with a receipt indicating the remaining balance on their card 50 or other information relating to their purchase record.

The card activation or recharging scenario is the same as that previously discussed with respect to a pre-paid calling card. The card 50 is activated or recharged with a set dollar amount enabling a user to purchase goods and services up to the pre-paid limit at any location that accepts said card as payment. During a typical card activation scenario, a customer requests an additional balance on the card from an activation terminal 52. This may be done directly by the user or through a clerk manning the terminal. The card is swiped through the card reader slot and the amount to be added to the pre-authorized card balance is entered on the keypad. At this point, the terminal dials out via the modem and awaits a response from the host computer 56. After communicating with the host computer 56 and transmitting the required information, the activation terminal 52 receives and displays a suitable response message. The clerk or user is then prompted to provide the required funds and is informed that the security number on the card has been activated for the amount shown. The transaction is completed by returning the card to the customer.

It is to be further noted that while the present invention has been described with respect to providing a pre-paid calling card system or a pre-paid card system, that the purchase of any goods, service or activity may utilize the pre-paid card system of the present invention as an alternative to pay-as-you-go or credit services.

It should be appreciated that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A method to enable customers to obtain pre-paid calling card accounts from a plurality of point-of-sale locations and to use the pre-paid calling card accounts to access a telephone network using a telephone, the method comprising:

transferring activation information associated with a particular pre-paid calling card account from a data terminal located at a particular one of the point of sale locations to a remote location having a database of pre-paid calling card accounts, the activation information being used to identify the particular pre-paid calling card account, the particular pre-paid calling card account being associated with a distributor of the particular pre-paid calling card account in order to track activation and distribution of the particular pre-paid calling card account;

activating the particular pre-paid calling card account in the database of prepaid calling card accounts in response to receipt of the activation information by associating an active call authorization amount with the particular pre-paid calling card account;

receiving access information transferred from a telephone to a call processor having access to the database of pre-paid calling card accounts, the call processor using the access information to identify the particular pre-paid calling card account and to establish a telephone call from the telephone to a desired number using the telephone network;

reducing the active call authorization amount associated with the particular pre-paid calling card account in correspondence with usage of the telephone network; and terminating access to the telephone network when the active call authorization amount is exhausted.

2. A method as recited in claim 1, further comprising:

receiving recharge information for the particular pre-paid calling card account, the recharge information being used to identify the particular pre-paid calling card account and to indicate a recharge authorization; and increasing the active call authorization amount associated with the particular pre-paid calling card account in the database of pre-paid calling card accounts in response to the recharge authorization.

3. A system for distributing and managing prepaid calling card accounts used to access a telephone network using a telephone, the prepaid calling card accounts being activated at a point-of-sale location, the system comprising:

a database of pre-paid calling card accounts located a location remote from the point-of-sale location;

a data terminal located at the point-of-sale location, the data terminal being used to transfer activation information associated with a particular pre-paid calling card account from the point-of-sale location to the remote location, the activation information being used to identify the particular pre-paid calling card's account, the particular pre-paid calling card account being associated with a distributor of the particular pre-paid calling card account;

a processing unit coupled to the database of prepaid calling card accounts, the processing unit activating the particular pre-paid calling card account in the database of prepaid calling card accounts in response to receipt of the activation information by associating an active call authorization amount with the particular pre-paid calling card account; and a call processor coupled to the database of pre-paid calling card accounts and to the telephone network, the call processor receiving, from a telephone, access information used to identify the particular pre-paid calling card account and to establish a telephone call from the telephone to a desired number using the telephone network, the call processor further reducing the active call authorization amount associated with the particular pre-paid calling card account in correspondence with usage of the telephone network.

4. A system as recited in claim 3, wherein the processing unit is further coupled to receive recharge information for the particular pre-paid calling card account, the recharge information being used to identify the particular pre-paid calling card account and to indicate a recharge authorization, the processor increasing the active call authorization amount associated with the particular pre-paid calling card account in the database of pre-paid calling card accounts in response to the recharge authorization.

5. A method to enable customers to obtain pre-paid calling card accounts from a plurality of point-of-sale locations and to use the pre-paid calling card accounts to access a telephone network using a telephone, the method comprising:

transferring activation information associated with one or more pre-paid calling card accounts from a data terminal located at a particular one of the point-of-sale locations to a remote location having a database of pre-paid calling card accounts, the activation information being used to identify the one or more pre-paid calling card accounts, the one or more pre-paid calling card accounts being associated with a distributor of the one or more pre-paid calling card accounts;

activating the one or more pre-paid calling card accounts in the database of prepaid calling card accounts in response to receipt of the activation information from the particular point-of-sale location by associating active call authorization amounts with the one or more pre-paid calling card accounts;

receiving access information transferred from a telephone to a call processor having access to the database of pre-paid calling card accounts, the call processor using the access information to establish a particular one of the one or more pre-paid calling card accounts and to establish a telephone call from the telephone to a desired number using the telephone network;

reducing the active call authorization amount associated with the particular one of the one or more pre-paid calling card accounts in correspondence with usage of the telephone network.

6. A method as recited in claim 5, further comprising:

receiving recharge information for the particular one of the one or more pre-paid calling card accounts, the recharge information being used to identify the particular one of the one or more pre-paid calling card accounts and to indicate a recharge authorization; and increasing the active call authorization amount associated with the particular one of the one or more pre-paid calling card accounts in the database of pre-paid calling card accounts in response to the recharge authorization.

7. A system for enabling customers to obtain pre-paid calling card accounts from a plurality of point-of-sale locations and to use the pre-paid calling card accounts to access a telephone network using a telephone, the method comprising:

a database of pre-paid calling card accounts located at a location remote from the point-of-sale locations;

means for transferring activation information associated with a particular pre-paid calling card account to the remote location, the activation information being used to identify the particular pre-paid calling card account, the particular pre-paid calling card account being associated with a distributor of the particular pre-paid calling card account;

means for activating the particular pre-paid calling card account in the database of prepaid calling card accounts in response to receipt of the activation information by associating an active call authorization amount with the particular pre-paid calling card account;

means for receiving access information transferred from a telephone and for identifying the particular pre-paid calling card account using the access information;

means for establishing a telephone call from the telephone to a desired number using the telephone network; and means for reducing the active call authorization amount associated with the particular pre-paid calling card account in correspondence with usage of the telephone network, and for terminating access to the telephone network when the active call authorization amount is exhausted.

8. A system as recited in claim 1, further comprising means for recharging the particular pre-paid calling card account by increasing the active call authorization amount associated with the particular pre-paid calling card account in the database of pre-paid calling card accounts.

9. A method for distributing pre-paid calling cards, used to access a telephone network using a standard telephone, from a plurality of point-of-sale locations, the pre-paid calling cards being activated at the point-of-sale locations, the method comprising:

transferring activation information uniquely associated with a particular pre-paid calling card from a particular point-of-sale location to a remote location having a database of pre-paid calling card accounts associated with the pre-paid calling cards, the activation information being used to identify the particular pre-paid calling card and to indicate a particular distributor of the pre-paid calling card;

activating a particular pre-paid calling card account associated with the particular pre-paid calling card in the database of prepaid calling card accounts in response to the activation information by associating an active call authorization amount with the particular pre-paid calling card account;

receiving access information associated with the particular pre-paid calling card from a standard telephone at a call processor having access to the database of pre-paid calling card accounts;

identifying, with the call processor, the particular pre-paid calling card account using the access information;

establishing a telephone call from the standard telephone to a desired telephone number using the telephone network;

reducing the active call authorization amount associated with the particular pre-paid calling card in correspondence with usage of the telephone network; and terminating access to the telephone network when the active call authorization amount is exhausted.

10. A method as recited in claim 9, further comprising:

receiving recharge information for the particular pre-paid calling card, the recharge information being used to identify the particular pre-paid calling card and to indicate a recharge authorization; and increasing the active call authorization amount associated with the particular pre-paid calling card account in the database of pre-paid calling card accounts in response to the recharge authorization.

11. A computerized system used to activate pre-paid calling cards and to track usage of the pre-paid calling cards, the computerized system comprising:

a database storing information associated with a plurality of prepaid calling cards;

a host computer coupled to the database and having a port connected to a telephone network, the host computer receiving activation information associated with a particular pre-paid calling card from a remote point-of-sale location via the telephone network, the activation information being used to identify the particular pre-paid calling card, the particular pre-paid calling card being associated with a distributor of the particular pre-paid calling card, the host computer activating the particular pre-paid calling card in the database in response to receipt of the activation information by associating an active call authorization amount with the particular pre-paid calling card; and a call processor coupled to the database and to the telephone network to receive access information transferred from a telephone, the access information being used by the call processor to identify the particular pre-paid calling card and to establish a telephone call from the telephone to a desired telephone number using the telephone network, the call processor reducing the active call authorization amount associated with the particular pre-paid calling card in correspondence with usage of the telephone network and halting communication with the desired telephone number when the active call authorization amount is exhausted.

12. A computerized system as recited in claim 11, wherein the host computer receives a recharge authorization associated with the particular pre-paid calling card from the telephone network, the host computer increasing the active call Authorization amount associated with the particular pre-paid calling card in response to the recharge authorization.

* * * * *

(12) EX PARTE REEXAMINATION CERTIFICATE (5070th)
United States Patent
Stimson et al.

(10) Number: US 5,721,768 C1
(45) Certificate Issued: Mar. 1, 2005

(54) PRE-PAID CARD SYSTEM AND METHOD

(75) Inventors: Charles J. Stimson, Garland, TX (US); Brady S. Beshear, Garland, TX (US)

(73) Assignee: Call Processing, Inc., Dallas, TX (US)

Reexamination Request:
No. 90/005,766, Jul. 6, 2000

Reexamination Certificate for:
Patent No.: 5,721,768
Issued: Feb. 24, 1998
Appl. No.: 08/751,499
Filed: Nov. 18, 1996

Related U.S. Application Data

(63) Continuation of application No. 08/407,094, filed on Mar. 20, 1995, now Pat. No. 5,577,109, which is a continuation-in-part of application No. 08/254,237, filed on Jun. 6, 1994, now Pat. No. 5,511,114.

(51) Int. Cl.[7] .................. G06H 5/00; G07D 7/00; H04M 15/00; H04M 17/00
(52) U.S. Cl. ............... 379/114.16; 379/114.15; 379/114.2; 379/144.01; 379/121.06; 235/380; 340/5.6
(58) Field of Search .................. 379/111–115, 121, 379/124–127, 130–131, 133–134, 144; 705/16–18, 21; 235/380–381

(56) References Cited

U.S. PATENT DOCUMENTS

| | | | |
|---|---|---|---|
| 5,327,485 A | | 7/1994 | Leaden |
| 5,353,335 A | * | 10/1994 | D'Urso et al. .............. 379/67 |
| 5,477,038 A | * | 12/1995 | Levine et al. |

FOREIGN PATENT DOCUMENTS

| | | | |
|---|---|---|---|
| JP | 9223659 | | 1/1992 |
| WO | 99/63744 | * | 12/1999 |

* cited by examiner

*Primary Examiner*—Duc Nguyen

(57) ABSTRACT

A pre-paid card system enables customers to make purchases using an authorized card. The system includes four main functional components: a plurality of cards, a host computer, a plurality of on-site activation terminals and a main processor. Each of the cards having a security number associated therewith. The card is typically formed of cardboard, paper or plastic and may include the security number in cleartext under a suitable blackout. The main management and processing of the system is effected by the host computer. The host includes a database for storing security numbers associated with authorized cards. The data terminals are remote from the host computer and connectible thereto for transmitting data between the terminals and the host computer. The processor is controlled by the host computer for enabling customer purchases using the authorized cards.

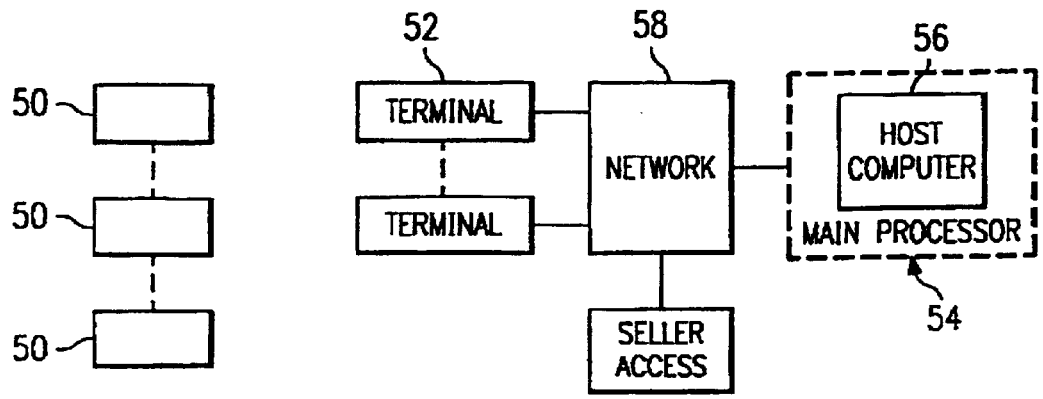

US 5,721,768 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4 and 12 are cancelled.

Claims 1–3 and 5–11 are determined to be patentable as amended.

1. A method to enable customers to obtain pre-paid calling card accounts from a plurality of point-of-sale locations and to use the pre-paid calling card accounts to access a telephone network using a telephone, the method comprising:

transferring activation information associated with a particular pre-paid calling card account from a data terminal located at a particular one of the point of sale locations to a remote location having a database of pre-paid calling card accounts, the activation information being used to identify the particular pre-paid calling card account, the particular pre-paid calling card account being associated with a distributor of the particular pre-paid calling card account [in order to track activation and distribution of the particular pre-paid calling card account];

activating the particular pre-paid calling card account in the database of prepaid calling card accounts in response to receipt of the activation information by associating an active call authorization amount with the particular pre-paid calling card account;

*for each pre-paid calling card account that is activated, maintaining in the database information sufficient to identify: (i) a date on which the particular pre-paid calling card account is activated, (ii) a particular point-of-sale location at which the particular pre-paid calling card account is activated, and (iii) the active call authorization amount that was associated with the particular pre-paid calling card account when activated on said date and from said point-of-sale location;* receiving access information transferred from a telephone to a call processor having access to the database of pre-paid calling card accounts, the call processor using the access information to identify the particular pre-paid calling card account and to establish a telephone call from the telephone to a desired number using the telephone network;

reducing the active call authorization amount associated with the particular pre-paid calling card account in correspondence with usage of the telephone network; [and]

terminating access to the telephone network when the active call authorization amount is exhausted*; and*

*billing a given distributor for the pre-paid calling card accounts so activated and associated with the given distributor as indicated by information maintained in the database.*

2. A method as recited in claim 1, further comprising:

receiving recharge information for the particular pre-paid calling card account, the recharge information being used to identify the particular pre-paid calling card account [and to indicate a recharge authorization]; [and]

increasing the active call authorization amount associated with the particular pre-paid calling card account in the database of pre-paid calling card accounts in response to the recharge [authorization] *information; and*

*for the particular pre-paid calling card account, maintaining in the database information sufficient to identify: (iv) a date on which the particular pre-paid calling card account is recharged, and (v) a particular point-of-sale location at which the particular pre-paid calling card account is recharged.*

3. A system for distributing and managing prepaid calling card accounts used to access a telephone network using a telephone, the prepaid calling card accounts being activated at a point-of-sale location, the system comprising:

a database of pre-paid calling card accounts located a location remote from the point-of-sale location;

a data terminal located at the point-of-sale location, the data terminal being used to transfer activation information associated with a particular pre-paid calling card account from the point-of-sale location to the remote location, the activation information being used to identify the particular pre-paid calling card's account, the particular pre-paid calling card account being associated with a distributor of the particular pre-paid calling card account;

a processing unit coupled to the database of prepaid calling card accounts, the processing unit activating the particular pre-paid calling card account in the database of prepaid calling card accounts in response to receipt of the activation information by associating an active call authorization amount with the particular pre-paid calling card account; and a call processor coupled to the database of pre-paid calling card accounts and to the telephone network, the call processor receiving, from a telephone, access information used to identify the particular pre-paid calling card account and to establish a telephone call from the telephone to a desired number using the telephone network, the call processor further reducing the active call authorization amount associated with the particular pre-paid calling card account in correspondence with usage of the telephone network*;*

*wherein the processing unit is further coupled to receive recharge information for the particular pre-paid calling card account, the recharge information being used to identify the particular pre-paid calling card account, the processor increasing the active call authorization amount associated with the particular pre-paid calling card account in the database of pre-paid calling card accounts in response to the recharge information;*

*wherein, for each pre-paid calling card account that is activated or recharged, the database includes information sufficient to identify: (i) a date on which the particular pre-paid calling card account is activated, (ii) a date on which the particular pre-paid calling card account is recharged, and (iii) the active call authorization amount that was associated with the particular pre-paid calling card account when activated or when recharged;*

*wherein the processing unit is also operative to bill a given distributor for the pre-paid calling card accounts*

*so activated or recharged and associated with the given distributor as indicated by information in the database.*

5. A method to enable customers to obtain pre-paid calling card accounts from a plurality of point-of-sale locations and to use the pre-paid calling card accounts to access a telephone network using a telephone, the method comprising:

transferring activation information associated with one or more pre-paid calling card accounts from a data terminal located at a particular one of the point-of-sale locations to a remote location having a database of pre-paid calling card accounts, the activation information being used to identify the one or more pre-paid calling card accounts, the one or more pre-paid calling card accounts being associated with a distributor of the one or more pre-paid calling card accounts;

activating the one or more pre-paid calling card accounts in the database of prepaid calling card accounts in response to receipt of the activation information from the particular point-of-sale location by associating active call authorization amounts with the one or more pre-paid calling card accounts;

*for each pre-paid calling card account that is activated, maintaining in the database information sufficient to identify: (i) a date on which the particular pre-paid calling card account is activated, (ii) a particular point-of-sale location at which the particular pre-paid calling card account is activated, and (iii) the active call authorization amount that was associated with the particular pre-paid calling card account when activated on said date and from said point-of-sale location;* receiving access information transferred from a telephone to a call processor having access to the database of pre-paid calling card accounts, the call processor using the access information to establish a particular one of the one or more pre-paid calling card accounts and to establish a telephone call from the telephone to a desired number using the telephone network;

reducing the active call authorization amount associated with the particular one of the one or more pre-paid calling card accounts in correspondence with usage of the telephone network; *and*

*billing a given distributor for the pre-paid calling card accounts so activated and associated with the given distributor as indicated by information maintained in the database.*

6. A method as recited in claim 5, further comprising:

receiving recharge information for the particular one of the one or more pre-paid calling card accounts, the recharge information being used to identify the particular one of the one or more pre-paid calling card accounts [and to indicate a recharge authorization]; [and ]

increasing the active call authorization amount associated with the particular one of the one or more pre-paid calling card accounts in the database of pre-paid calling card accounts in response to the recharge [authorization] *information; and*

*for the particular pre-paid calling card account, maintaining in the database information sufficient to identify: (iv) a date on which the particular pre-paid calling card account is recharged, and (v) a particular point-of-sale location at which the particular pre-paid calling card account is recharged.*

7. A system for enabling customers to obtain pre-paid calling card accounts from a plurality of point-of-sale locations and to use the pre-paid calling card accounts to access a telephone network using a telephone, the method comprising:

a database of pre-paid calling card accounts located at a location remote from the point-of-sale locations;

means for transferring activation information associated with a particular pre-paid calling card account to the remote location, the activation information being used to identify the particular pre-paid calling card account, the particular pre-paid calling card account being associated with a distributor of the particular pre-paid calling card account;

means for activating the particular pre-paid calling card account in the database of prepaid calling card accounts in response to receipt of the activation information by associating an active call authorization amount with the particular pre-paid calling card account;

*means for maintaining in the database, for each pre-paid calling card account that is activated, information sufficient to identify: (i) a date on which the particular pre-paid calling card account is activated, (ii) a particular point-of-sale location at which the particular pre-paid calling card account is activated, and (iii) the active call authorization amount that was associated with the particular pre-paid calling card account when activated on said date and from said point-of-sale location;* means for receiving access information transferred from a telephone and for identifying the particular pre-paid calling card account using the access information;

means for establishing a telephone call from the telephone to a desired number using the telephone network; [and]

means for reducing the active call authorization amount associated with the particular pre-paid calling card account in correspondence with usage of the telephone network, and for terminating access to the telephone network when the active call authorization amount is exhausted*; and*

*means for billing a given distributor for the pre-paid calling card accounts so activated and associated with the given distributor as indicated by information maintained in the database.*

8. A system as recited in claim 1, further comprising means for recharging the particular pre-paid calling card account by increasing the active call authorization amount associated with the particular pre-paid calling card account in the database of pre-paid calling card accounts*; and*

*means for maintaining in the database information sufficient to identify: (iv) a date on which the particular pre-paid calling card account is recharged, and (v) a particular point-of-sale location at which the particular pre-paid calling card account is recharged.*

9. A method for distributing pre-paid calling cards, used to access a telephone network using a standard telephone, from a plurality of point-of-sale locations, the pre-paid calling cards being activated at the point-of-sale locations, the method comprising:

transferring activation information uniquely associated with a particular pre-paid calling card from a particular point-of-sale location to a remote location having a database of pre-paid calling card accounts associated with the pre-paid calling cards, the activation information being used to identify the particular pre-paid calling card and to indicate a particular distributor of the pre-paid calling card;

activating a particular pre-paid calling card account associated with the particular pre-paid calling card in the database of prepaid calling card accounts in response to the activation information by associating an active call authorization amount with the particular pre-paid calling card amount;

*for each pre-paid calling card account that is activated, maintaining in the database information sufficient to identify: (i) a date on which the particular pre-paid calling card account is activated, (ii) a particular point-of-sale location at which the particular pre-paid calling card account is activated, and (iii) the active call authorization amount that was associated with the particular pre-paid calling card account when activated on said date and from said point-of-sale location;* receiving access information associated with the particular pre-paid calling card from a standard telephone at a call processor having access to the database of pre-paid calling card accounts;

identifying, with the call processor, the particular pre-paid calling card account using the access information;

establishing a telephone call from the standard telephone to a desired telephone number using the telephone network;

reducing the active call authorization amount associated with the particular pre-paid calling card in correspondence with usage of the telephone network; [and]

terminating access to the telephone network when the active call authorization amount is exhausted*; and*

*billing a given distributor for the pre-paid calling card accounts so activated and associated with the given distributor as indicated by information maintained in the database.*

10. A method as recited in claim 9, further comprising:

receiving recharge information for the particular pre-paid calling card, the recharge information being used to identify the particular pre-paid calling card [and to indicate a recharge authorization]; [and]

increasing the active call authorization amount associated with the particular pre-paid calling card account in the database of pre-paid calling card accounts in response to the recharge [authorization] *information;* and

*for the pre-paid calling card account, maintaining in the database information sufficient to identify: (iv) a date on which the particular pre-paid calling card account is recharged, and (v) a particular point-of-sale location at which the particular pre-paid calling card account is recharged.*

11. A computerized system used to activate pre-paid calling cards and to track usage of the pre-paid calling cards, the computerized system comprising:

a database storing information associated with a plurality of prepaid calling cards;

a host computer coupled to the database and having a port connected to a telephone network, the host computer receiving activation information associated with a particular pre-paid calling card from a remote point-of-sale location via the telephone network, the activation information being used to identify the particular pre-paid calling card, the particular pre-paid calling card being associated with a distributor of the particular pre-paid calling card, the host computer activating the particular pre-paid calling card in the database in response to receipt of the activation information by associating an active call authorization amount with the particular pre-paid calling card, *the host computer being further operative to increase the active call authorization amount associated with the particular pre-paid calling card in response to given recharge information*; and a call processor coupled to the database and to the telephone network to receive access information transferred from a telephone, the access information being used by the call processor to identify the particular pre-paid calling card and to establish a telephone call from the telephone to a desired telephone number using the telephone network, the call processor reducing the active call authorization amount associated with the particular pre-paid calling card in correspondence with usage of the telephone network and halting communication with the desired telephone number when the active call authorization amount is exhausted*;*

*wherein, for each pre-paid calling card that is activated, the database includes information sufficient to identify: (i) a date on which the particular pre-paid calling card is activated, (ii) a date on which the particular pre-paid calling card is recharged, and (iii) the active call authorization amount that was associated with the particular pre-paid calling card when activated or when recharged; and*

*the host computer also operative to bill a given distributor for the pre-paid calling card accounts so activated or recharged and associated with the given distributor as indicated by information in the database.*

\* \* \* \* \*